(12) United States Patent
Lin (10) Patent No.: US 6,793,115 B2
(45) Date of Patent: Sep. 21, 2004

(54) HAND TOOL WITH VOCAL FUNCTION

(76) Inventor: Arlo H. T. Lin, Akara Building, 24 De Castro Street, Wickhams Cay I, Road Town, Tortola (VG)

( * ) Notice: Subject to any disclaimer, the term of this patent is extended or adjusted under 35 U.S.C. 154(b) by 0 days.

(21) Appl. No.: 10/346,944

(22) Filed: Jan. 17, 2003

(65) Prior Publication Data

US 2004/0094602 A1 May 20, 2004

(30) Foreign Application Priority Data

Nov. 14, 2002 (TW) ........................... 91218462 U (51) Int. Cl.[7] .................... B23K 3/08; B23K 3/04; H05B 1/00; F24C 1/00
(52) U.S. Cl. .................. 228/51; 228/53; 219/229; 219/240; 126/236
(58) Field of Search ............ 228/51, 53; 219/227–229, 219/240, 507; 126/226, 236, 237, 413

(56) References Cited

U.S. PATENT DOCUMENTS

| | | | | |
|---|---|---|---|---|
| 4,691,691 A | * | 9/1987 | Patenaude | .................... 126/414 |
| 4,708,278 A | * | 11/1987 | Opfer | ....................... 228/122.1 |
| 5,868,633 A | * | 2/1999 | Keheley | ....................... 473/220 |
| 6,037,724 A | * | 3/2000 | Buss et al. | ..................... 318/71 |
| 6,037,872 A | * | 3/2000 | Dunnum | ..................... 340/586 |
| 6,111,495 A | * | 8/2000 | Garside | .................... 340/309.7 |
| 6,129,292 A | * | 10/2000 | Leung et al. | ................... 239/33 |
| 6,148,700 A | * | 11/2000 | Upholz | ........................ 81/486 |
| 2002/0172017 A1 | * | 11/2002 | Tarnowski et al. | ........... 361/730 |
| 2003/0013959 A1 | * | 1/2003 | Grunwald et al. | ........... 600/437 |

* cited by examiner

Primary Examiner—L. Edmondson
(74) Attorney, Agent, or Firm—Alan D. Kamrath; Nikolai & Mersereau, P.A.

(57) ABSTRACT

The vocal circuit for a hand tool includes a circuit board, a switch connected with the circuit board, and a chip and a speaker installed on the circuit board. The hand tool may be a gas-burning soldering device including a fuel reservoir, a soldering iron subject to heat caused via burning fuel flowing from a pipe and an igniter received in the shell for igniting the fuel. The switch of the vocal circuit is located between a button of the igniter and a main switch mounted on the shell. The main switch includes a pin extending into the shell for contact with the switch of the vocal circuit and the button of the igniter through the switch of the vocal circuit.

20 Claims, 9 Drawing Sheets

HAND TOOL WITH VOCAL FUNCTION

BACKGROUND OF INVENTION

1. Field of Invention

The present invention relates to a hand tool with a vocal function.

2. Related Prior Art

Many hand tools have been devised for various tasks. Almost all of the hand tools hurt users if not used properly. Some of them might cause grave damages to users. Improper use of the hand tools may be due to the users' absent-mindedness that often occurs after they work with the tools for long hours. Improper use of the hand tools may result from the user's unfamiliarity with the tools, that happens particularly when manuals for the hand tools are missing.

Hence, the present invention is intended to obviate or at least alleviate the problems encountered in the prior art.

SUMMARY OF INVENTION

It is the primary objective of the present invention to provide a hand tool with a vocal function.

According to the present invention, a handle tool includes a shell and a vocal circuit. The vocal circuit includes a circuit board, a switch connected with the circuit board and that can be switched between an off position and an on position, a chip installed on the circuit board and a speaker installed on the circuit board.

The hand tool may be a gas-burning soldering device. The hand tool may include a fuel reservoir received in the shell, a valve mounted on the fuel reservoir, a pipe leading from the valve, a soldering iron mounted on the shell and subjected to heat caused via burning fuel flowing from the pipe and an igniter received in the shell for igniting the fuel. The igniter includes a button formed thereon.

In an aspect, the switch of the vocal circuit is mounted on the shell.

In another aspect, a main switch is mounted on the shell. The switch of the vocal circuit is received in the shell. The switch of the vocal circuit is located between the button of the igniter and the main switch. The main switch includes a pin extending into the shell for contact with the switch of the vocal circuit and the button of the igniter through the switch of the vocal circuit.

Other objectives, advantages, and novel features of the invention will become more apparent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF EMBODIMENTS

Referring to FIGS. 1–4, according to a first embodiment of the present invention, a hand tool such as a soldering device is shown. The hand tool includes a shell 10 for receiving elements. Generally, the shell 10 consists of two halves. The shell 10 includes a handle 17 extending from the remaining portion thereof at an angle. A screen 16 is mounted on the shell 10 in order to cover an aperture (not numbered) defined in the shell 10. Vocal information can be transmitted through the aperture.

A fuel reservoir 11 is received in the shell 10. A valve 12 is mounted on the fuel reservoir 11. A pipe 14 leads from the valve 12 to a nozzle 18. A soldering iron 13 is mounted on the shell 10. The soldering iron 13 is subject to heat caused by ignition of fuel flowing from the nozzle 18.

An igniter 20 is received in the shell 10 adjacent to the valve 12. The igniter 20 includes a button (not numbered) formed thereon. The button of the igniter 20 can be pushed so that the igniter 20 produces an electric arc for igniting the fuel. The igniter 20 is conventional and therefore will not be further described in detail.

A switch 21 is movably mounted on the shell 10. The switch 21 is connected with the valve 12. Operation of the switch 21 causes operation of the valve 12. The switch 21 includes a pin 22 extending from aside thereof into the shell 10. As the switch 21 is moved on the shell 10, the pin 22 is moved in the shell 10.

A vocal circuit includes a circuit board 31 received in the shell 10 and a switch 32 connected with the circuit board 31 through a wire 36. The switch 32 is located between the button of igniter 20 and the pin 22. A chip 33, a speaker 34 and a battery 35 are installed on the circuit board 31.

Figure 1:
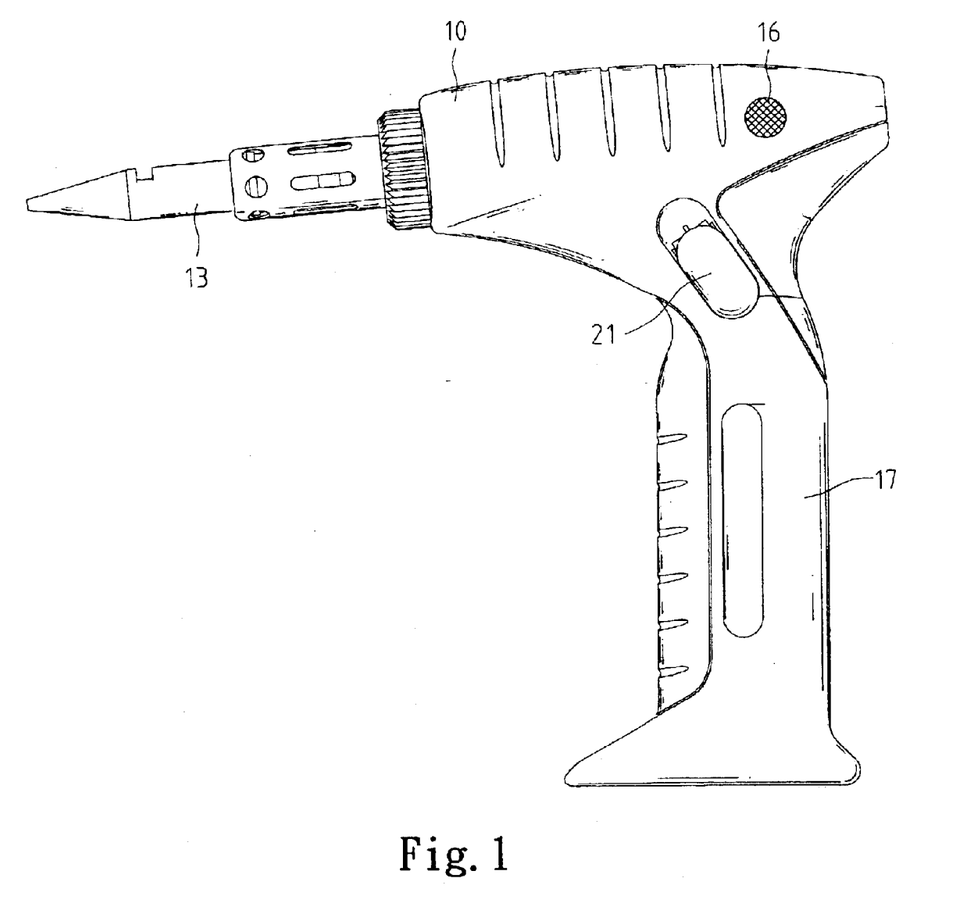
FIG. 1 is a side view of a hand tool with a vocal function according to a first embodiment of the present invention.
Figure 2:
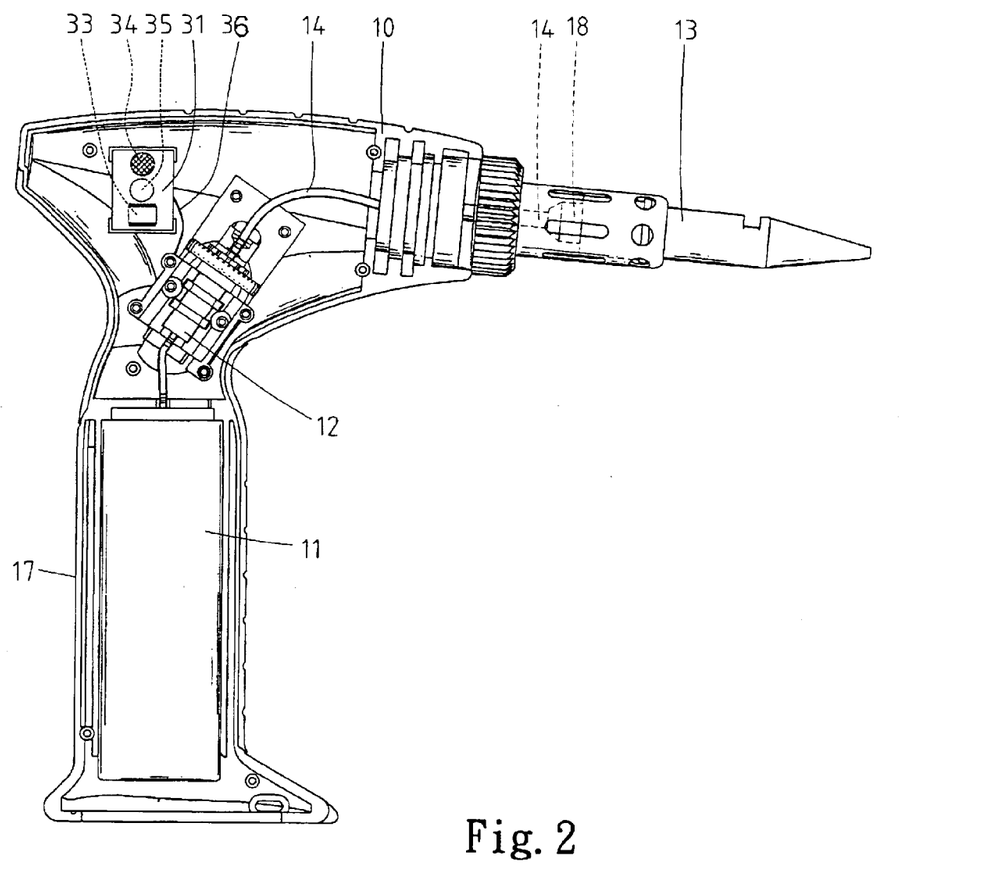
FIG. 2 shows an opposite side of the hand tool shown in FIG. 1 with a portion of shell removed in order to show its elements.
Figure 3:
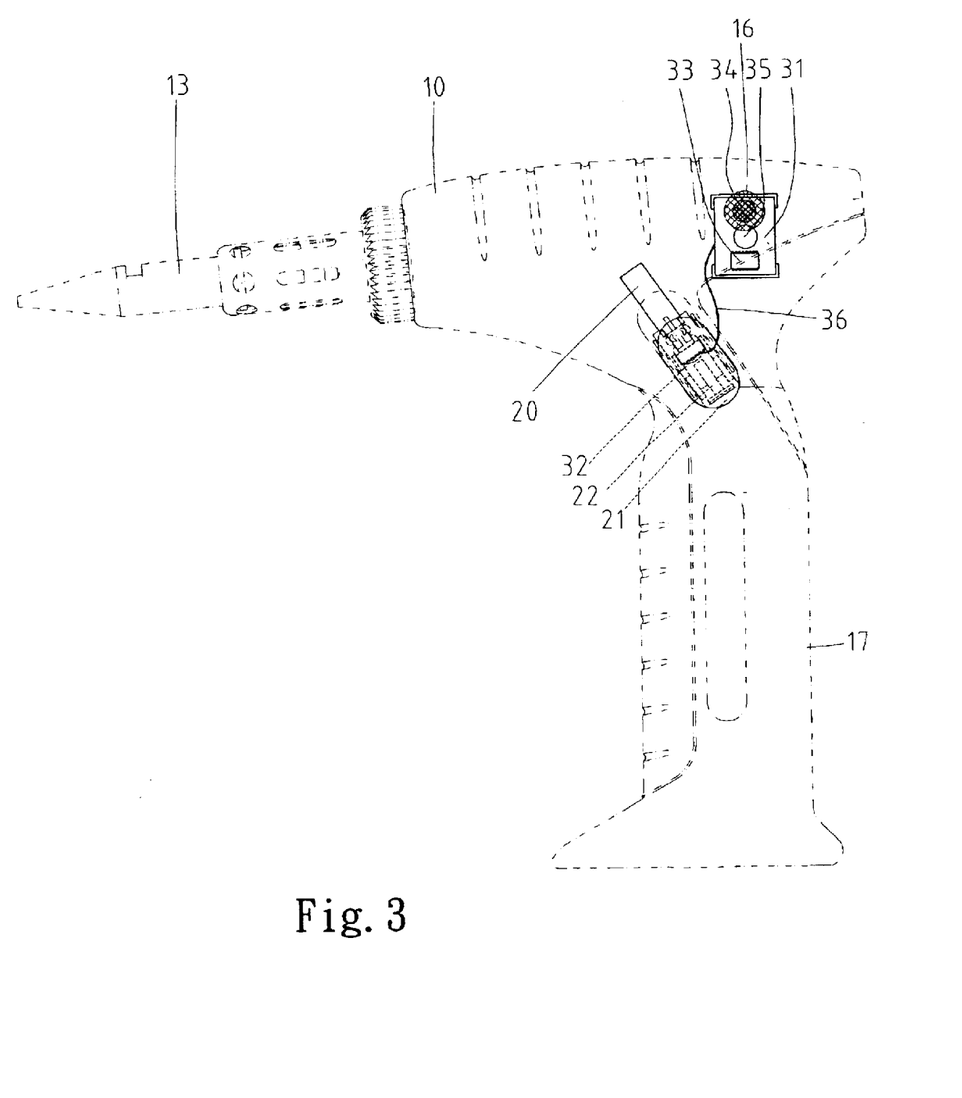
FIG. 3 is similar to FIG. 1 but showing the hand tool in another position.
Figure 4:
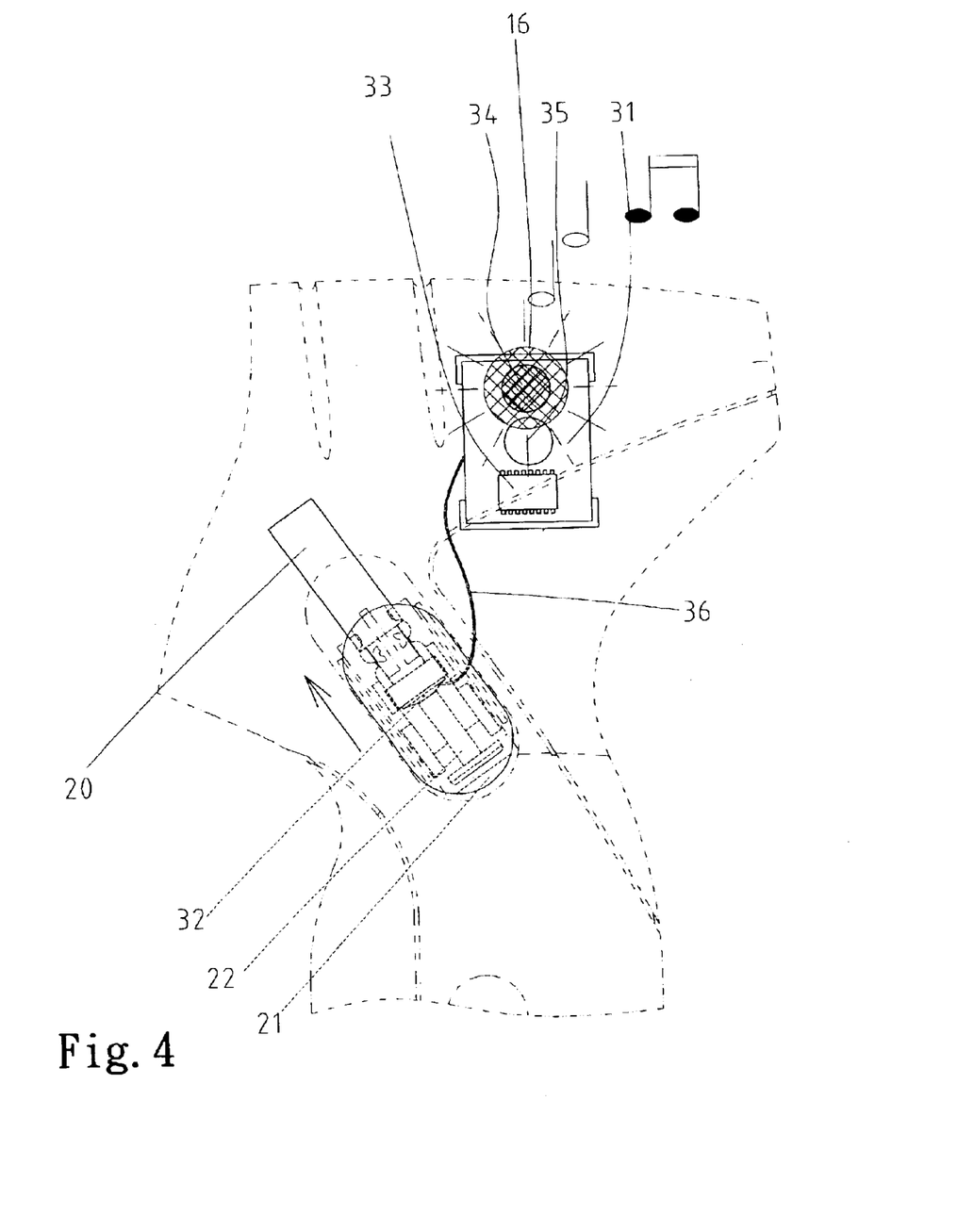
FIG. 4 is similar to FIG. 3 but showing the hand tool in another position.

Referring to FIG. 4, when the switch 21 is in a first position, the valve 12 is in a closed position, the igniter 20 is in an off position, and the circuit board 31 is in an off position. As the switch 21 is moved to a second position, the valve 12 is moved to an open position, and the circuit board 31 is moved to an on position. Vocal information is provided based on a process to be described. As the switch 21 is moved to a third position, the switch of the igniter 20 is pushed so as to produce an electric arc for igniting the fuel. When the switch 21 is released, a spring (not shown) received in the igniter 20 forces the switch 21 back to the second position.

Figure 5:
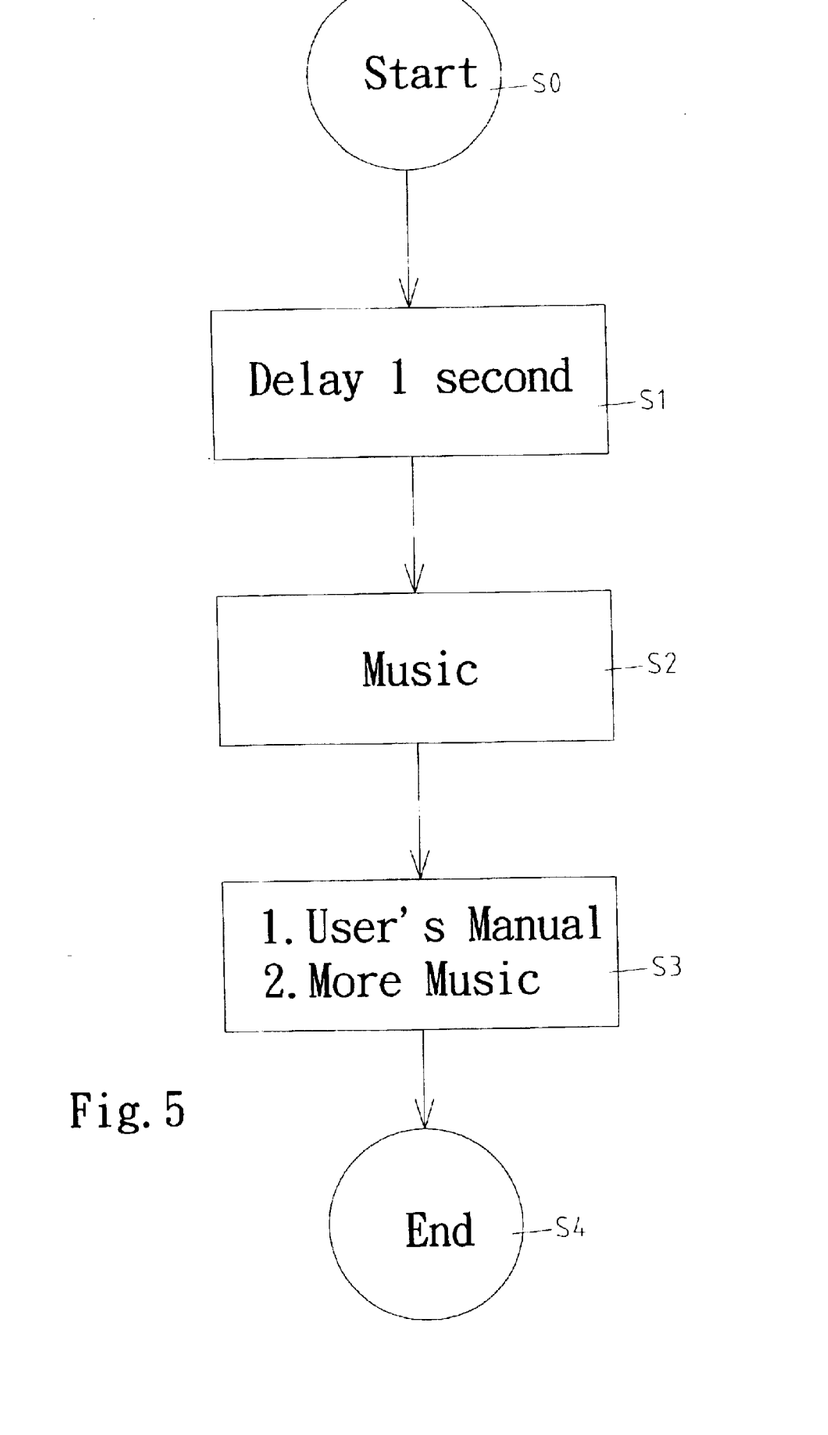
FIG. 5 is a block diagram of a process of the vocal function of the hand tool shown in FIG. 1.

Referring to FIG. 5, in step S0, the process is started when the vocal circuit is turned to the on position. In step S1, the process is delayed for about a second. In step S2, music is provided. In step S3, a vocal manual of the hand tool and/or other music is provided. In step S4, the process goes to an end.

Figure 6:
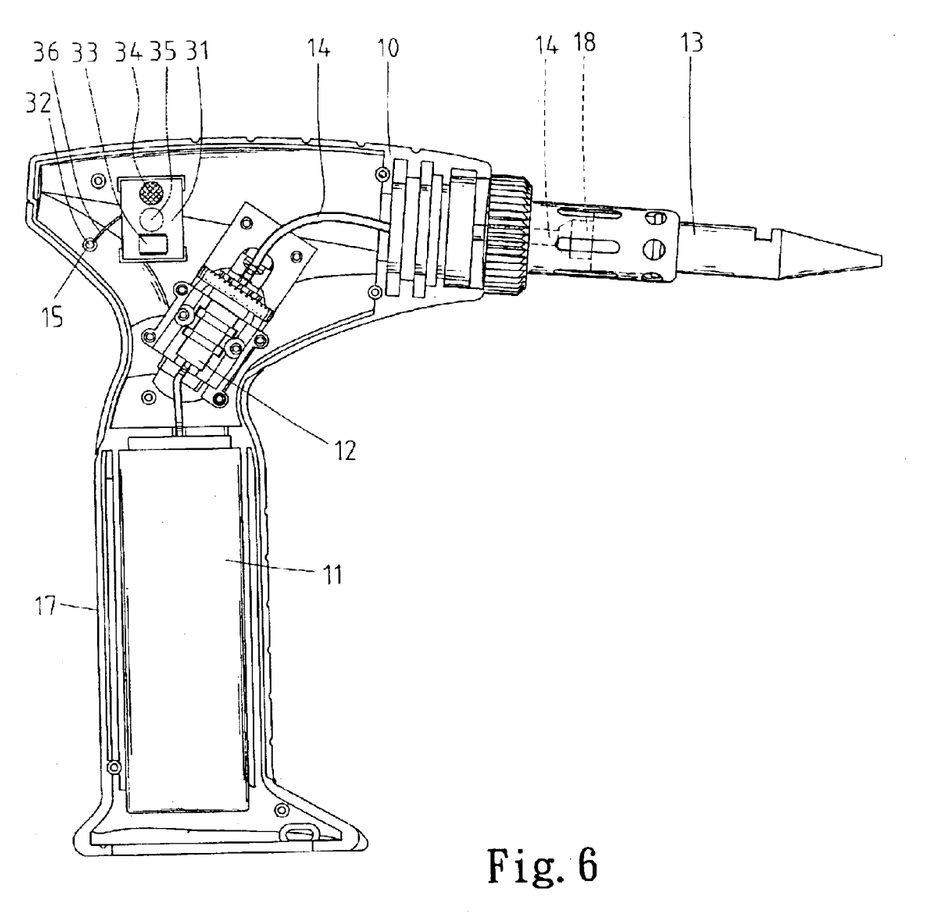
FIG. 6 is similar to FIG. 2 but showing a hand tool with a vocal function according to a second embodiment of the present invention.
Figure 7:
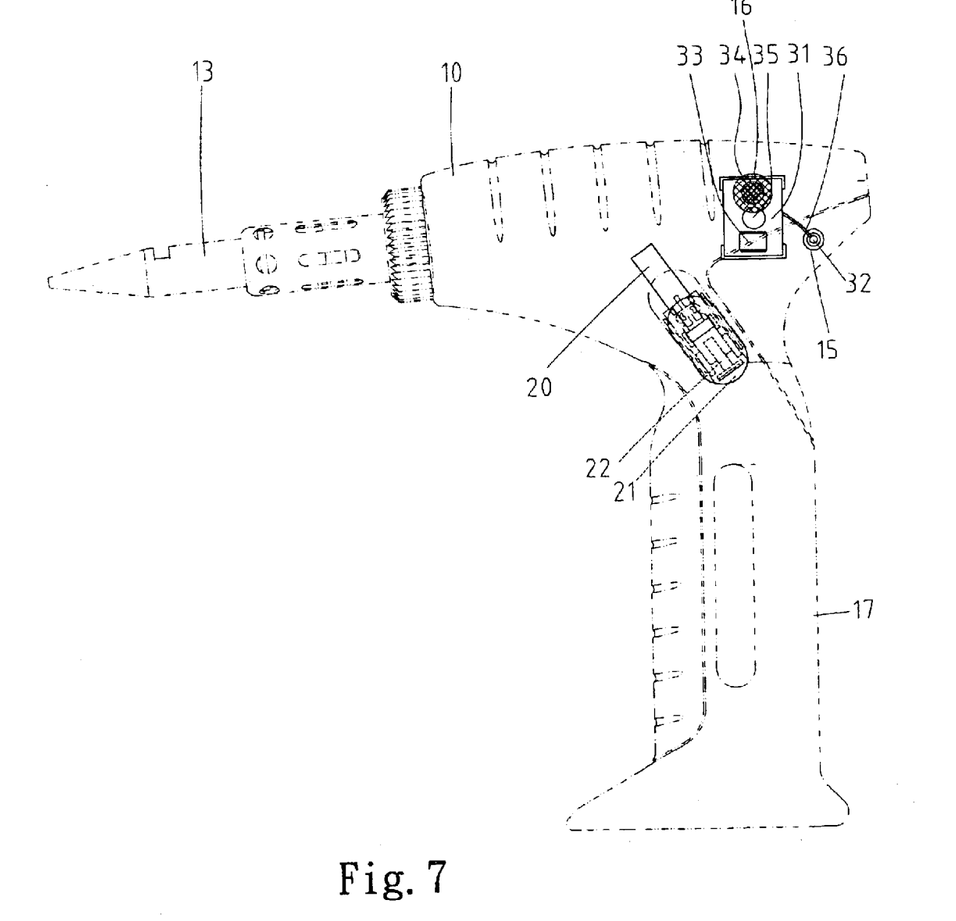
FIG. 7 shows an opposite side of the hand tool shown in FIG. 6 with a portion of a shell removed in order to show its elements.

FIGS. 6 and 7 show a hand tool according to a second embodiment of the present invention. The second embodiment is different from the first embodiment in that the switch 32 is not located between the switch of the igniter 20 and the pin 22 but exposed through an aperture 15 defined in the shell 10. Thus, the switch 32 can be directly pushed instead of through the switch 21. That is, the vocal circuit can be turned on directly independent of the valve 12 and the igniter 20.

Figure 8:
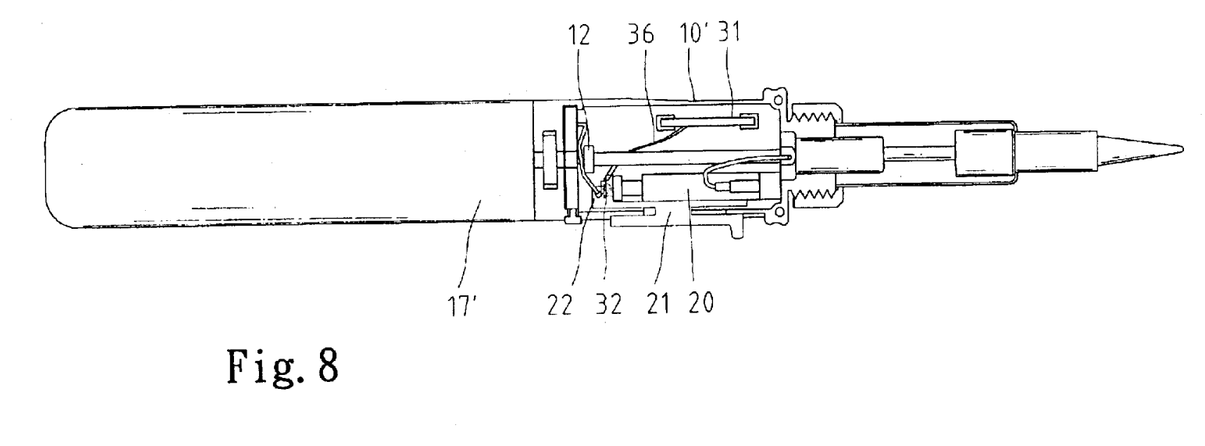
FIG. 8 is a top view of a hand tool with a vocal function according to a third embodiment of the present invention with a portion of a shell removed in order to show its elements.
Figure 9:
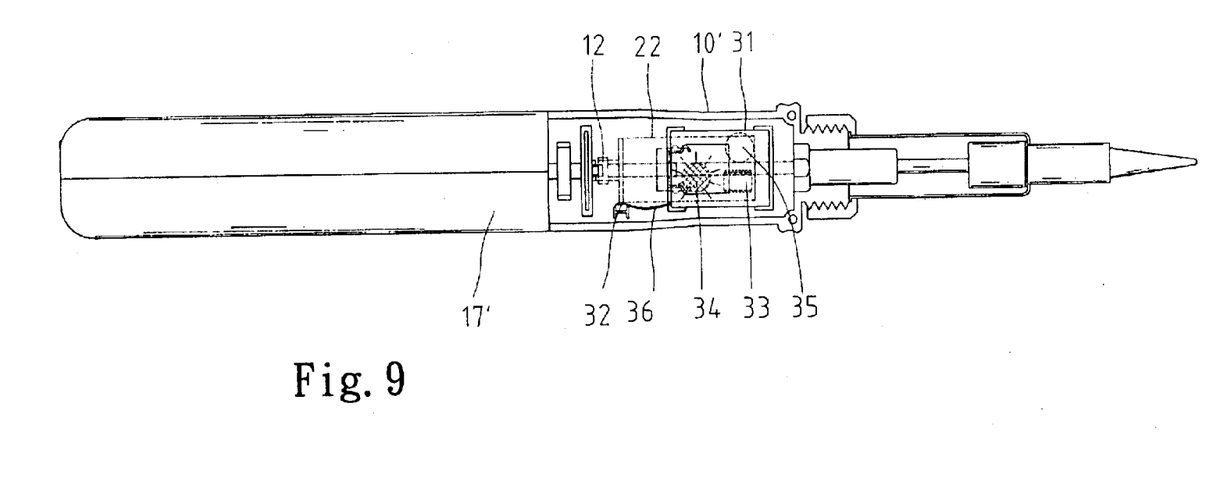
FIG. 9 is a top view of the hand tool shown in FIG. 8 with a portion of the shell removed in order to show its elements.

FIGS. 8 and 9 show a hand tool according to a third embodiment of the present invention. The third embodiment is different from the first embodiment in using a 10'. The shell 10' includes a handle 17' extending in line with the remaining portion thereof.

Figure 10:
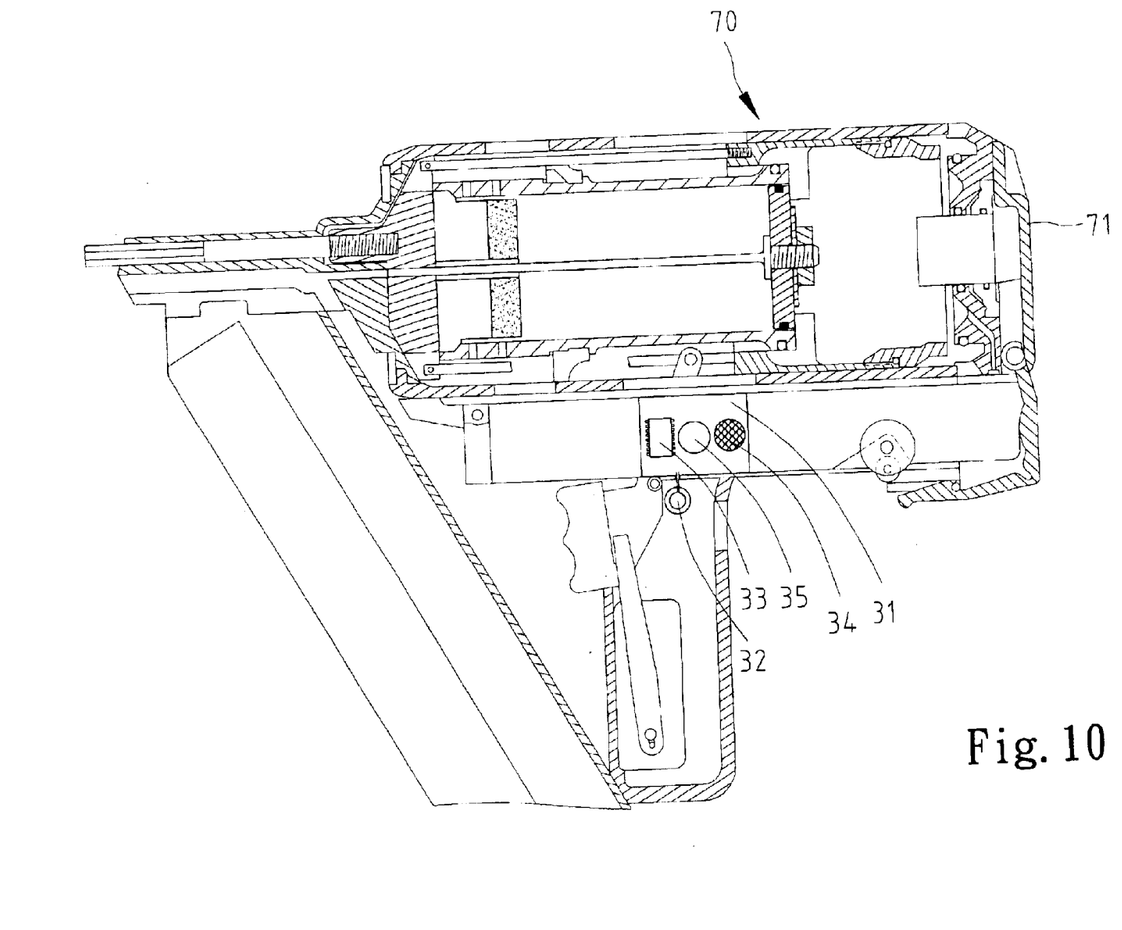
FIG. 10 is a cross-sectional view of a hand tool with a vocal function according to a fourth embodiment of the present invention.

FIG. 10 shows a hand tool in the form of a driving device 70 according to a fourth embodiment of the present invention. The driving device 70 includes a shell 71 and the above-mentioned vocal circuit received in the shell 71. The switch 32 of the vocal circuit 30 is exposed through an aperture (not numbered) defined in the shell 71. The driving device 70 is like conventional driving devices and therefore will not be further described in detail.

The present invention has been described through detailed illustration of some embodiments. Those skilled in the art can derive variations from the embodiments without departing from the scope of the present invention. Hence, the embodiment shall not limit the scope of the present invention defined in the claims.

What is claimed is:

1. A handle tool including:
    a shell; and
    a vocal circuit including a circuit board, a switch connected with the circuit board and that can be switched between an off position and an on position, a chip installed on the circuit board and a speaker installed on the circuit board, wherein the hand tool is a soldering device.

2. The hand tool according to claim 1 wherein the switch of the vocal circuit is mounted on the shell.

3. The hand tool according to claim 1 including a main switch mounted on the shell, wherein the switch of the vocal circuit is received in the shell for contact with the main switch.

4. The hand tool according to claim 3 wherein the main switch includes a pin extending into the shell for contact with the switch of the vocal circuit.

5. The hand tool according to claim 1 wherein the hand tool is a gas-burning soldering device.

6. The hand tool according to claim 5 including:
    a fuel reservoir received in the shell;
    a valve mounted on the fuel reservoir;
    a pipe leading from the valve;
    a soldering iron mounted on the shell and subject to heat caused via burning fuel flowing from the pipe; and
    an igniter received in the shell for igniting the fuel, the igniter including a button formed thereon.

7. The hand tool according to claim 6 wherein the switch of the vocal circuit is mounted on the shell.

8. The hand tool according to claim 6 including a main switch mounted on the shell for contact with the button of the igniter.

9. The hand tool according to claim 8 wherein the main switch includes a pin extending into the shell for contact with the button of the igniter.

10. The hand tool according to claim 8 wherein the switch of the vocal circuit is received in the shell for contact with the main switch.

11. The hand tool according to claim 10 wherein the switch of the vocal circuit is located between the button of the igniter and the main switch.

12. The hand tool according to claim 11 where the main switch includes a pin extending into the shell for contact with the switch of the vocal circuit and the button of the igniter through the switch of the vocal circuit.

13. The hand tool according to claim 12 wherein when the main switch can be moved between a first position where the valve is in a closed position, and the igniter in an off position, and the vocal circuit in an off position, a second position where the valve is moved to an open position, and the vocal circuit to an on position, and a third position where the switch of the igniter is pushed so as to produce an electric arc, for igniting the fuel.

14. The hand tool according to claim 13 wherein when the main switch is released, a spring received in the igniter forces the main switch back to the second position through the switch of the igniter.

15. The hand tool according to claim 14 wherein when moved to the on position, the vocal circuit performs a process including steps of:
    delaying for a period of time;
    providing music; and
    selectively providing one of a vocal manual of the hand tool and other music.

16. The hand tool according to claim 15 wherein the period of time is about a second.

17. The hand tool according to claim 16 including to a nozzle installed at an end of the pipe so that the soldering iron is subject to heat caused by ignition of fuel flowing from the nozzle.

18. A hand tool including:
    a shell, and
    a vocal circuit including a circuit board, a switch connected with the circuit board and that can be switched between an off position and an on position, a chip installed on the circuit board and a speaker installed on the circuit board, wherein the hand tool is a driving tool.

19. The hand tool according to claim 1 including a screen mounted on the shell for covering an aperture defined in the shell and aligned with the speaker.

20. The hand tool according to claim 18 including a main switch mounted on the shell, wherein the switch of the vocal circuit is received in the shell for contact with the main switch.

* * * * *